US007796559B2

(12) United States Patent
Beziot et al.

(10) Patent No.: US 7,796,559 B2
(45) Date of Patent: Sep. 14, 2010

(54) METHOD FOR PROCESSING QUALITY OF SERVICE OF A DATA TRANSPORT CHANNEL

(75) Inventors: Nathalie Beziot, Le Plessis Robinson (FR); Aude Pichelin, Issy les Moulineaux (FR); Laëtitia Fontaine, Issy les Moulineaux (FR)

(73) Assignee: France Telecom, Paris (FR)

( * ) Notice: Subject to any disclaimer, the term of this patent is extended or adjusted under 35 U.S.C. 154(b) by 127 days.

(21) Appl. No.: 11/885,683

(22) PCT Filed: Mar. 3, 2006

(86) PCT No.: PCT/FR2006/050192

§ 371 (c)(1), (2), (4) Date: Mar. 21, 2008

(87) PCT Pub. No.: WO2006/092541

PCT Pub. Date: Sep. 8, 2006

(65) Prior Publication Data

US 2008/0279108 A1   Nov. 13, 2008

(30) Foreign Application Priority Data

Mar. 3, 2005   (FR) .................................. 05 02177

(51) Int. Cl.
    *H04W 4/00* (2009.01)
(52) U.S. Cl. ....................... 370/332; 370/230; 370/241; 370/338; 370/352
(58) Field of Classification Search ................. 455/522; 370/241, 352, 395.21, 328, 338
See application file for complete search history.

(56) References Cited

U.S. PATENT DOCUMENTS

| 7,209,439 | B2* | 4/2007 | Rawlins et al. | ............... 370/230 |
|---|---|---|---|---|
| 2001/0036175 | A1* | 11/2001 | Hurtta | ........................ 370/352 |
| 2002/0114305 | A1 | 8/2002 | Oyama et al. | |
| 2004/0184432 | A1* | 9/2004 | Gateva et al. | ............... 370/349 |
| 2005/0089020 | A1* | 4/2005 | Ahlback et al. | ............. 370/352 |
| 2006/0002333 | A1* | 1/2006 | Skog et al. | ................... 370/328 |
| 2006/0114855 | A1* | 6/2006 | Zheng | ........................ 370/331 |
| 2008/0068995 | A1* | 3/2008 | Skog | ........................ 370/230.1 |

FOREIGN PATENT DOCUMENTS

WO   WO 03/081843   10/2003

* cited by examiner

*Primary Examiner*—Ricky Ngo
*Assistant Examiner*—Rasheed Gidado
(74) *Attorney, Agent, or Firm*—Cohen Pontani Lieberman & Pavane LLP

(57) ABSTRACT

A method for processing quality of service of a signaling data transport channel in a packet transmission network comprising at least one management node (4), wherein, for a data transport channel, the management node (4) receives a quality of service profile associated with said channel, containing a parameter (SI) indicating signaling, detects (E2) whether, in the quality of service profile, the signaling indicating parameter is activated so as to determine whether it is a signaling data transport channel, and in that case, processes the signaling data transport channel as a priority over any other media data transport channel during execution of at least one quality of service processing mechanism applied to the signaling data transport channel.

14 Claims, 2 Drawing Sheets

| UMTS quality of service parameters | | Diffserv PHB | DSCP |
|---|---|---|---|
| Traffic class | THP | | |
| Conversational | / | Expedited Forwarding | 101110 |
| Streaming | / | Assured Forwarding AF4$_1$ | 100010 |
| Interactive | 1 | Assured Forwarding AF3$_1$ | 011010 |
| | 2 | Assured Forwarding AF2$_1$ | 010010 |
| | 3 | Assured Forwarding AF1$_1$ | 001010 |
| Background | / | Best Effort | 000000 |

METHOD FOR PROCESSING QUALITY OF SERVICE OF A DATA TRANSPORT CHANNEL

RELATED APPLICATIONS

This is a U.S. National Phase Application under 35 USC 371 of International Application PCT/FR2006/050192 filed on Mar. 3, 2006.

FIELD OF THE INVENTION

The invention relates to a method of processing the quality of service of a data transport channel, such as a PDP (Packet Data Protocol) context, for the transport of signaling data, and a management node for the implementation of this method.

BACKGROUND OF THE INVENTION

The IMS (IP Multimedia Subsystem) is a sub-system of the UMTS (Universal Mobile Telecommunication System) system, introduced in UMTS Release 5, intended to allow dynamic establishment and control of multimedia sessions between at least two items of equipment (for example between two user terminals or between a user terminal and an application server).

The establishment of a multimedia (for example audio, video and/or textual) session between two items of equipment, for example two mobile terminals, respectively calling and called, in the IMS is performed in two stages:

1. Primary Signaling PDP Context

The calling equipment activates a first signaling session, called the primary signaling PDP context. During this signaling session, the calling and called items of equipment exchange signaling data so as to negotiate the characteristics of the call (in particular the types of coding supported).

2. Secondary Data Transport PDP Context

After the phase of negotiating the characteristics of the call, the calling item of equipment activates a second session, called the secondary media data transport PDP context, intended for the transport of data relating to the call proper. It may for example involve a video and audio data transport session, consultation of a multimedia server or a simple voice over IP session.

The term "media data" is understood to refer to the data specific to a communication, in particular audio, video and/or textual data, different from the signaling data already exchanged in the primary PDP context.

During the activation of a PDP context (signaling data or media data transport) on the initiative of an item of equipment, the radio access network of the UMTS (UTRAN), and more particularly the home RNC (Radio Network Controller) to which the equipment is tied, allocates network resources to it by activating a communication channel, commonly called an "RAB" (Radio Access Bearer Parameters), at the radio access network level. The RAB is defined by a set of quality of service parameters corresponding overall to those of the quality of service profile of the activated PDP context.

Subsequently, the term "data transport channel" will be used to refer both to a PDP context and to an RAB.

The activation of any channel, whether it involves a PDP context or an RAB, for signaling data transport or for media data transport, makes it necessary to negotiate beforehand the quality of service parameters related to this channel. The present invention is more particularly concerned with the activation of a signaling channel (that is to say of a signaling data transport channel), negotiation of the quality of service parameters and prioritization at the transport level of such a channel.

It is paramount that the activation of the primary signaling PDP context, in the course of which the signaling parameters for the secondary call-related media data transport PDP context are negotiated, be performed correctly, failing which this secondary context cannot be activated. It ought therefore to be processed in a priority manner. For this purpose, the 3GPP ($3^{rd}$ Generation Partnership Project) standard has introduced a parameter SI (Signaling Indication) indicating whether the packets which will be transmitted in the PDP context do or do not belong to signaling, depending on whether it is associated with the value "Yes" or "No". This parameter SI forms part of the set of parameters specifying the quality of service that are requested by an item of equipment wishing to open a PDP context. When an item of equipment wishes to open a PDP signaling context, it indicates: "SI=Yes".

The 3GPP standard advocates using the quality of service parameter THP (Traffic Handling Priority) when the parameter SI=YES. This parameter THP, related to the "Interactive" traffic class, makes it possible to differentiate the interactive sessions with respect to one another from the quality of service standpoint. Each interactive session is associated with a parameter THP that can take the value 1, 2 or 3, the value 1 corresponding to the highest priority level. Stated otherwise, the standard suggests, when the parameter SI is activated (SI=Yes), that the value of the parameter THP be fixed at 1. The PDP signaling context thus exploits the priority level due to the value 1 of the parameter THP. However, if during the activation of a new primary signaling PDP context, PDP contexts corresponding to interactive sessions, having a parameter THP equal to 1, are already activated or undergoing activation, the network processes the activated PDP contexts corresponding to the interactive sessions in progress and the PDP signaling context in the same manner.

SUMMARY OF THE INVENTION

One aspect of the present invention is therefore aimed at providing a method of processing the quality of service of a data transport channel in a packet mode transmission network comprising at least one management node, in which, for a data transport channel, the management node receives a quality of service profile associated with this channel, containing a signaling indication parameter (SI), such that it makes it possible to improve the priority processing of the data packets containing signaling.

This problem is solved by the fact that the management node
  detects whether, in the quality of service profile, the signaling indication parameter is activated so as to determine whether a signaling data transport channel is involved, and
  if such is the case, processes the signaling data transport channel in a priority manner with respect to any other media data transport channel during the execution of at least one quality of service processing mechanism applied to the signaling data transport channel.

It will be noted that the term "management node" is understood to refer to a node of the network whose role is to manage the data stream traffic. It relates in particular, but not limitingly:
  for UMTS, to RNCs, SGSNs and GGSNs
  for GPRS, to BSCs, SGSNs and GGSNs, and
  for any other mobile telephone system, to routers, or nodes, able to manage the packet stream traffic.

An embodiment of the invention involves differentiating the processing of the signaling channel with a different priority level from that of any other media data transport channel, during the process of activating the signaling channel and/or on an established signaling channel. For example, the management node can process the signaling channel in a priority manner with respect to any other channel for media data transport:

- during the execution of an admission control for the signaling channel undergoing activation,
- when it undertakes preemption (during or after channel activation), and/or
- when it undertakes the allocation of differentiated resources (during or after channel activation).

Advantageously, in order to process in a priority manner the signaling channel to be activated, the management node modifies the quality of service profile received, so as to increase the priority level of the signaling channel to be activated.

The modification of the quality of service profile received preferably consists in modifying at least one of the parameters of the group comprising a traffic class, a parameter defining a relative priority of the signaling channel for the allocation of resources and a parameter defining a relative priority of the signaling channel for preemption.

As parameter defining a relative priority of the signaling channel for allocation of resources and/or preemption, the following may be used, by way of nonlimiting examples:

- the parameter ARP (Allocation Retention Priority),
- the parameter THP (Traffic Handling Priority), or else
- a parameter derived from several quality of service attributes such as an attribute relating to the subscriber's priority level, for example the ARP, an attribute relating to the priority level of the service used, for example the traffic class.

By virtue of such a modification of the signaling channel quality of service profile, it is processed in a priority manner not only by the node having modified the profile, but also by the other nodes of the network with the role of forwarding the data conveyed by this channel, without thereby requiring intrinsic modification of these other nodes.

Advantageously still, the management node modifies, in the quality of service profile received, at least one channel throughput parameter so as to optimize the use of the network resources.

The quantity of data conveyed in a signaling channel is relatively low compared with that conveyed in a media data transport channel. The invention therefore makes it possible to decrease the throughput or throughputs specified in the quality of service profile requested so as to decrease the throughput allocated to the signaling channel and thus optimize the use of the network resources.

In an advantageous variant of the invention, the management node marks the signaling data packets conveyed by said signaling channel in such a way that the network ensures priority processing of said packets during their transport.

By virtue of this, the signaling channel is processed in a priority manner at the transport level (that is to say after its activation), during the transport of the signaling data packets. The marking of the signaling data packets allows the other nodes of the network that are intended to forward these packets through the network to automatically detect their priority level and to process them accordingly, without using either the parameter SI or the parameter THP.

It will be noted here that, in the case of a network comprising several management nodes, for example a UMTS network comprising RNCs, SGSNs and GGSNs, the quality of service profile of the signaling channel can be modified, at the control level, by a first node, for example by the SGSN, while at the transport level, the signaling packets can be marked by a second node, for example the RNC which, first, receives the signaling data and is responsible for retransmitting them through the network, across an IP link, in the form of packets.

Preferably, the management node marks the signaling data packets conveyed by said signaling channel with the aid of a DSCP field (DiffServ Code Point).

At the transport level, the network uses the Diffserv mechanism, defined by the IETF (Internet Engineering Task Force), to differentiate the quality of service processing operations applied to the data packets transported by the various data transport PDP contexts. Each packet of data has, in its header, a DSCP field "DiffServ Code Point" that can take various values coded on six bits. To each value of DSCP there corresponds a behavior called "Diffserv PHB" (Per Hop Behavior) at the network node level the whole way along the path of the packet. The "EF" (Expedited Forwarding) behavior, corresponding to the value "101110" of the DSCP field, ensures a priority service with small lag, low jitter (Δt between various packets when crossing a node or network) and low packet loss. The "GSMA" association (GSM Association) proposes that the packets of the streams of the "conversational" traffic class be marked with the DSCP field corresponding to the EF behavior so as to give them priority with respect to the streams belonging to the other traffic classes. It is therefore particularly beneficial to divert the use of this DSCP field to give the signaling streams higher priority, for example by allocating the DSCP fields of these streams the value "101110" corresponding to the "EF" behavior. By virtue of this, the signaling streams are given the same priority as the conversational streams.

A second aspect of the invention relates to a management node for a packet mode transmission network, comprising

- means for detecting a signaling channel, designed to determine whether, in a quality of service profile associated with a data transport channel, a signaling indication parameter (SI) is activated so as to detect whether a signaling channel is involved,
- means for controlling the node in such a way that it processes said signaling channel in a priority manner with respect to any other channel for media data transport during the execution of at least one quality of service processing mechanism applied to the signaling channel.

A third aspect of the invention relates to a packet mode transmission network, comprising at least one node as defined above.

A fourth aspect of the invention relates to a software module for processing a signaling channel, for a management node of a packet mode transmission network, comprising software instructions able to control the execution of the steps of the method previously defined by the management node, as well as the recording medium, readable by a computer, on which this software module is recorded.

DETAILED DESCRIPTION OF THE DRAWINGS

Figure 1:
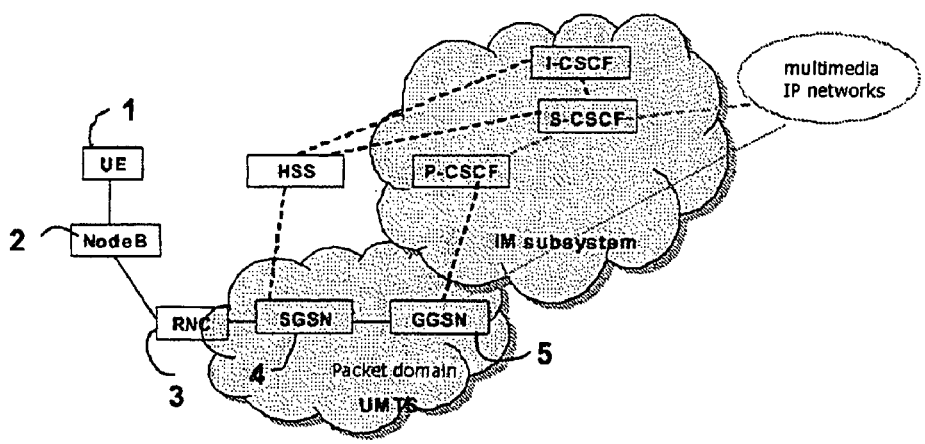
FIG. 1 represents a simplified diagram of the architecture of the IMS system and of the UMTS network.

Represented in FIG. 1 is a packet mode mobile communication network, corresponding in this instance to the PS domain (Packet Switched domain), that will subsequently be called the "packet domain", of the UMTS core network, and the IP multimedia sub-system (IMS). The packet domain of the UMTS core network comprises a node SGSN (Serving GPRS Support Node) playing the role of locating the subscriber in a locating zone, called the RA (Routing Area) and of managing the communication link with the access network. The SGSN stores the profile of each subscriber and monitors the network resources requested by each subscriber, and
   a node GGSN (Gateway GPRS Support Node) playing the role of gateway between the UMTS network and the external packet switching networks (the public Internet, a private intranet, etc.).

The access network of the UMTS, called UTRAN (UMTS Terrestrial Radio Access Network), constituting the radio part of the UMTS network, comprises radio transmission equipment, called NodeBs, to which the user terminals, also called UE (User Equipment), connect, and
   RNCs (Radio Network Controllers), each RNC controlling a plurality of NodeBs.

Represented in FIG. 2 is a transmission channel comprising a UE 1, a NodeB 2, an RNC 3, an SGSN 4 and a GGSN 5.

As has already been made explicit, the establishment of a communication session between the UE 1 and another UE (or an application server AS) in the IMS is performed in two stages: the UE 1 activates firstly a primary signaling PDP context for exchanging signaling data (codec supported, type of media data exchanged, etc.) with the other UE,
   then a secondary PDP context for transport of the media data (video, audio and/or textual for example) specific to the multimedia or simple-media communication session.

Figure 2A:
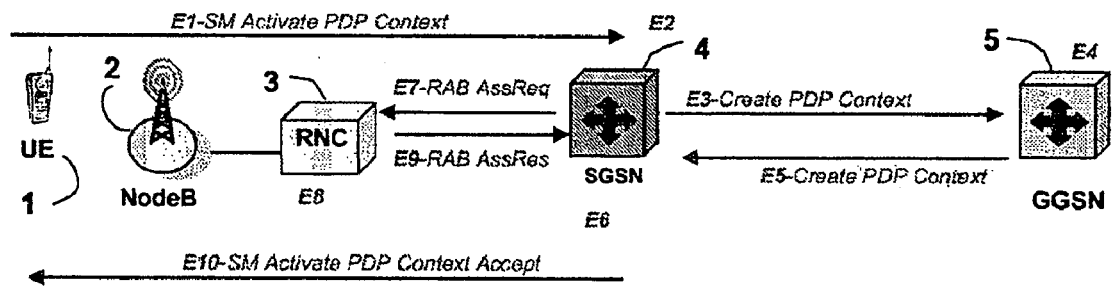
FIGS. 2A and 2B represent the various steps of the process of activating a PDP context.
Figure 2B:
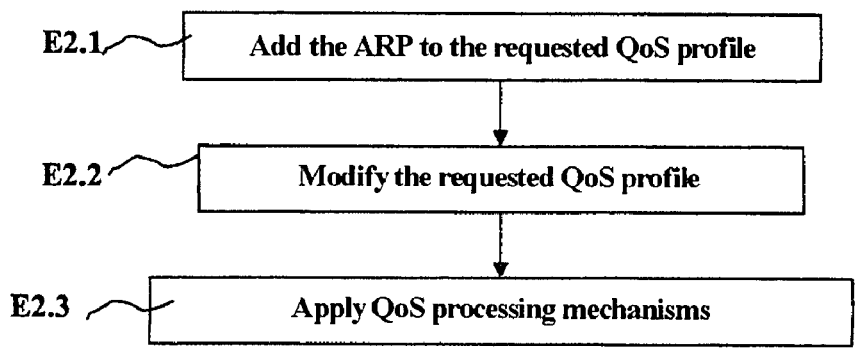

The process of activating and marking the primary signaling PDP context will now be described with reference to FIGS. 2A and 2B.

Activation of the PDP Signaling Context

Step E1: The UE 1 sends its home SGSN 4 a request to activate a primary PDP context—SM Activate PDP Context Request—with a quality of service profile requested by UE1, commonly called the QoS (Quality of Service) profile, comprising a set of quality of service parameters, defined in the 3GPP standard, such as in particular:

the traffic class (Conversational, Streaming, Interactive or Background) indicating the desired type of traffic,
   the parameter THP (Traffic Handling Priority), for the "Interactive" traffic class, that can take the value 1, 2 or 3 and that makes it possible to prioritize the streams of the "Interactive" traffic class with respect to one another,
   the throughput guaranteed on the uplink, defining the minimum throughput for the real time traffic on the uplink, for the "Conversational" and "Streaming" traffic classes, and
   the throughput guaranteed on the downlink, defining the minimum throughput for the real time traffic on the downlink, for the "Conversational" and "Streaming" traffic classes,
   the maximum throughputs, on the uplink and downlink, defining the maximum throughput on the uplink and downlink, for all the traffic classes (Conversational, Streaming, Interactive and Background), and
   the parameter SI (Signaling Indication), taking the value "Yes" or "No", indicating whether the PDP context does or does not convey signaling data.

The primary PDP context to be activated being a PDP signaling context, the SI parameter of the requested QoS profile is activated (SI=Yes). The UE 1 thus indicates that the PDP context to be activated will convey signaling traffic.

Step E2: This step is divided into three sub-steps represented in FIG. 2B.

Sub-Step E2.1: Addition of the ARP Parameter to the Requested QoS Profile

The SGSN 4 receives the request for activation of a primary PDP context, originating from the UE 1. It then consults the profile of the subscriber UE1 in the HLR (Home Location Register) database, containing the information relating to the subscribers managed by the operator, extracts therefrom the value of the parameter ARP (Allocation/Retention Priority) subscribed by the subscriber and adds it to the quality of service profile requested by the UE1.

Sub-Step E2.2: Modification of the Requested QoS Profile

The SGSN 4 detects whether, in the quality of service profile requested by UE1, the parameter SI is activated (SI=Yes) so as to determine whether a PDP signaling context is involved. This being the case, it modifies, if necessary, in the QoS profile requested, at least one of the two parameters "traffic class" and "ARP", so as to increase the priority level of the PDP signaling context to be activated. In the particular example of the description, the SGSN 4 modifies the traffic class by assigning it the value "Conversational" and the parameter ARP by assigning it the value 1. The PDP signaling context thus benefits from the priority due to the PDP contexts of "Conversational" type having an ARP priority level equal to 1.

If the traffic class requested originally by UE1 is neither "Conversational" nor "Streaming", the QoS profile requested by UE1 and received by the SGSN 4 does not contain any guaranteed throughputs. In this case, after having changed the traffic class to "Conversational", the SGSN 4 adds the throughputs guaranteed on the uplink and downlink to the requested QoS profile. The values of these guaranteed throughputs are fixed so as to optimize the use of the network resources. If the QoS profile requested by UE1 and received by the SGSN 4 already contains guaranteed throughputs on the uplink and downlink, the SGSN 4 decreases them so as to optimize the use of the network resources. As the signaling streams require only few network resources, it is unnecessary to allocate them overly large throughputs. By way of nonlimiting example, if the guaranteed throughputs requested originally are 384 kbits/sec, the SGSN 4 decreases them to 32 or to 64 kbits/sec, so as to use the network resources in an optimal manner.

The SGSN 4 also decreases the maximum throughputs (on the uplink and downlink) contained in the QoS profile requested by UE1 and received by the SGSN 4.

Sub-Step E2.3: Application of the QoS Processing Mechanisms

The SGSN 4 processes the PDP signaling context to be activated in a priority manner with respect to any other PDP context (undergoing activation or already activated) for media data transport during the execution of a first quality of service processing mechanism, namely admission control, applied to the PDP signaling context to be activated.

The SGSN 4 also processes the PDP signaling context to be activated in a priority manner with respect to any other PDP context for media data transport during the execution of the following other two quality of service processing mechanisms applied to the PDP context to be activated:

the preemption of resources, and
the allocation of differentiated resources.

The preemption mechanism consists, for the SGSN 4, in the event of congestion, in preempting the resources of one or more already activated media data transport PDP context(s), so as to allocate them to the PDP signaling context to be activated.

The mechanism for allocating differentiated resources consists, for the SGSN 4, in optimizing the use of the network resources during the allocation of resources to the PDP signaling context. As already made explicit above, the PDP signaling contexts convey a relatively low quantity of data with respect to the PDP media data transport contexts (already activated or undergoing activation).

Step E3: The SGSN 4 sends the request for activation of a PDP context to the GGSN 5—Create PDP Context Request—with the quality of service profile requested by the UE 1 then modified by the SGSN 4.

Step E4: On receipt of the PDP context activation request, the GGSN 5 applies the quality of service processing mechanisms—admission control, preemption and allocation of differentiated resources—taking account of the modified quality of service profile ("Conversational" traffic class, ARP=1, reduced guaranteed throughputs and/or reduced maximum throughputs).

Step E5: The GGSN 5 sends the SGSN 4 a positive response to the request for activation of the PDP signaling context—Create PDP Context Response, comprising the QoS profile negotiated for this context.

Step E6: The SGSN receives the agreement of the GGSN to activate the PDP signaling context, with the negotiated QoS profile. It is recalled here that, following the modification of the QoS profile requested by the SGSN 4 in step E2.2, the parameter ARP equals 1. The SGSN 4 splits the ARP into four sub-parameters in the following manner:
Priority level=1 (high priority)
Vulnerability to preemption=NO
Preemption capacity=YES
Queuing authorized=NO Step E7: The SGSN 4 sends the RNC 3 an RAB (Radio Access Bearer) allocation request—RAB AssReq—with a list of quality of service attributes associated with the RAB corresponding overall to the quality of service parameters requested originally by the UE 1 then modified by the SGSN 4.

Step E8: The RNC 3 receives the RAB allocation request with the list of quality of service attributes comprising the parameter SI=Yes and the other quality of service parameters, requested by the UE 1 and possibly modified by the SGSN 4 and the GGSN 5.

As in step E2, the RNC 3 determines that the RAB requested is envisaged to transport signaling data, by detecting the parameter SI=Yes in the list of quality of service attributes requested. It then processes the signaling RAB to be activated in a priority manner with respect to any other RAB (undergoing activation or already activated) for media data transport during the execution of the admission control mechanism for the signaling RAB to be activated. The RNC 3 calculates the resources necessary for the activation of this new signaling RAB and processes it in a priority manner with respect to any other RAB for media data transport during the execution of the resource preemption and differentiated resource allocation mechanisms.

Step E9: The RNC 3 notifies the SGSN of the acceptance of the allocation request for an RAB, by sending the RAB AssRes message.

Step E10: After establishment of the RAB, the SGSN 4 sends the UE 1 a message—SM Activate PDP Context Accept—indicating that the activation of the PDP signaling context is accepted.

After step E10, the primary signaling PDP context is activated and conveys signaling data between the UE 1 and the other UE (or the application server AS) with which the UE 1 desired to establish a multimedia session in the IMS.

Marking of the PDP Signaling Context

After activation of the PDP signaling context, on detection of the parameter SI activated (SI=Yes), the signaling data are marked by a node of the network. The marking is performed in the DSCP field here by allocating the value "101110" corresponding to the EF behavior. By virtue of this, the signaling data are processed with the highest priority level. This marking is carried out here by the home RNC 3 of UE 1, in the up direction of the link in relation to the UE1 and by the home RNC of the other UE, in the down direction of the link in relation to the UE1. During transport of these data through the network, each of the other management nodes (SGSN and GGSN) determines that signaling data are involved by detecting the parameter SI activated (SI=Yes) and then verifies that the DSCP field of these signaling data does actually have the value "101110" corresponding to the EF behavior. Each management node of the network (RNC, SGSN and GGSN) is in fact designed to, when it receives data:
determine whether signaling data are involved by detecting the parameter
SI activated (SI=Yes),
if such is the case, verify the DSCP field of these data.
if this field has a value other than that corresponding to the EF behavior ("101110"), modify the DSCP field by allocating it the value corresponding to the EF behavior ("101110").
otherwise, not modify it.

In general, the node which marks signaling data with the DSCP field "101110" corresponding to the EF behavior is preferably the node of the network which, first, receives these data and is responsible for retransmitting them to the network through an IP link and, consequently, in the form of an IP packet. Thus, the packets are processed with a high priority level right from the start of their transport through the network. However, it would be possible to envisage that this marking is performed by another node, for example the SGSN.

The DSCP field of the signaling packets having the value "101110" corresponding to the EF behavior, the management nodes of the network process these packets with a high priority, due to the streams of the "Conversational" traffic class although such a stream type is not involved but rather a simple signaling stream.

When the traffic conditions change, the management nodes of the network (RNC, SGSN and/or GGSN) may be required to perform resource preemption and/or differentiated resource allocation by thus modifying the respective resources allocated to the various open PDP contexts. During the application of these quality of service processing mechanisms, the nodes process the activated PDP signaling context in a priority manner with respect to any other PDP context (undergoing activation or already activated) for media data transport, as in step E2.3.

Figures 3, 4:
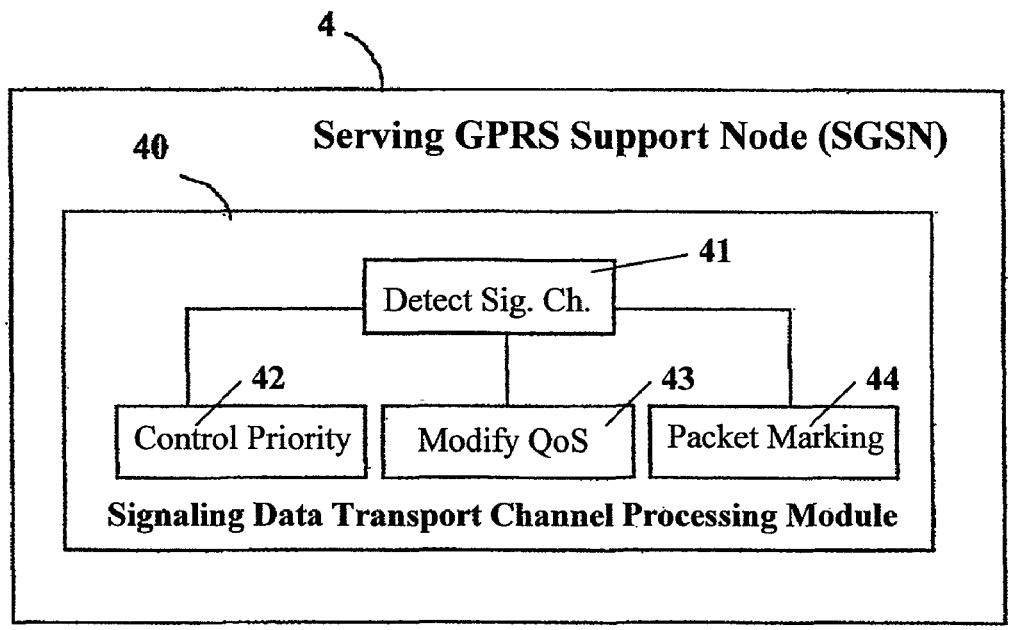
FIG. 3 represents a functional block diagram of a management node of the network.
FIG. 4 represents a lookup table of correspondences between UMTS quality of service parameters, Diffserv behaviors and DSCP values.

The management node SGSN 4 will now be described with reference to FIG. 3. For the sake of clarity, only the elements of node 4 that are related to the invention will be made explicit.

The node 4 comprises a signaling data transport channel processing module 40. This is a software module comprising software instructions for controlling the execution by the node of the steps of the previously described method. More precisely, the module 40 comprises the following elements:

- a block 41 for detecting a signaling channel, the latter being associated with a quality of service profile,
- a control block 42 intended to control a priority processing of a signaling channel with respect to any other media data transport channel, during the application of various quality of service processing mechanisms,
- a block 43 for modifying the quality of service profile of a signaling channel, and
- a block 44 for marking the signaling data packets conveyed by a signaling channel and designed to verify the marking of the signaling data packets and, if necessary, perform this marking, in such a way that the network ensures priority processing of these packets during their transport.

The block 41 is designed to determine whether, in the quality of service profile of a data transport channel (undergoing activation or already activated), the signaling indication parameter SI is activated (SI=Yes), so as to detect whether a signaling channel is involved.

The control block 42 is designed to control the node 4 in such a way that it processes a signaling channel (undergoing activation or already activated) in a priority manner with respect to any other media data transport channel during the application of the various quality of service processing mechanisms, in this instance admission control, preemption of resources and differentiated allocation of resources.

The block 43 for modifying the quality of service profile of a signaling channel is designed to

- modify at least one of the two parameters, traffic class and ARP, so as to increase the priority level of the signaling channel,
- add guaranteed throughputs on the uplink and downlink to the QoS profile, if necessary, or modify the guaranteed throughputs on the uplink and downlink that are already present in the QoS profile, as well as the maximum uplink and downlink throughputs of the signaling channel so as to optimize the use of the network resources.

It is recalled that, in the particular example of the description, the block 43 is designed to, if necessary, modify the traffic class by assigning it the value "Conversational" and the ARP by assigning it the value 1, add or reduce the guaranteed throughputs (on the uplink and downlink) and reduce the maximum throughputs (on the uplink and downlink).

The block 43 could be designed to modify other parameters of the signaling channel quality of service profile.

The marking block 44 is designed to, on receipt of signaling data (the latter having been detected by the block 41), verify the DSCP field in the signaling data

- if the DSCP field has a value other than that corresponding to the EF behavior ("101110"), modify the DSCP field by allocating it the value corresponding to the EF behavior ("101110").
- otherwise, not modify it.

In the particular example described previously, the marking of the signaling data by the DSCP field "101110" is performed by the RNCs 3. The other nodes of the network (SGSN 4 and GGSN 5) merely verifying the marking.

In the particular example of the description, the other nodes of the network (RNC 3 and GGSN 5) also build in a software module 40 for processing signaling data transport channels, comprising the software blocks 41 (signaling channel detection), 42 (control), 43 (QoS profile modification) and 44 (marking). It could also be envisaged that some nodes possess only some of these software blocks. For example, the QoS profile modification block 43 need not be built into the RNC 3 and the GGSN 5, insofar as it is built into the SGSNs.

The invention claimed is:

1. A method of processing the quality of service of a signaling data transport channel in a packet mode transmission network comprising at least one management node apparatus comprising a processor, in which, for processing a signaling data transport channel, the management node apparatus receives from a user terminal a request to activate the signaling data transport channel with a quality of service profile requested by the user terminal and containing a set of quality of service parameters, said set of quality of service parameters comprising a signaling indication parameter (SI), wherein the method comprises the steps of:

detecting with the management node apparatus whether, in the quality of service profile, the signaling indication parameter is activated so as to determine whether a signaling data transport channel is involved; and if such is the case, modifying with the management node apparatus at least one quality of service parameter of the set of quality of service parameters of the quality of service profile to increase the priority level of the signaling channel to be activated and processing with the management node apparatus the signaling data transport channel in a priority manner with respect to any other media data transport channel during the execution of at least one quality of service processing mechanism applied to the signaling data transport channel.

2. The method as claimed in claim 1, in which, in order to modify the quality of service profile received, the management node apparatus modifies at least one of the parameters of the group comprising a traffic class, a parameter defining a relative priority of the signaling channel for the allocation of resources and a parameter defining a relative priority of the signaling channel for preemption.

3. The method as claimed in claim 1, in which the management node apparatus modifies, in the quality of service profile received, at least one channel throughput parameter so as to optimize the use of the network resources.

4. The method as claimed in claim 1, in which the management node apparatus marks the signaling data packets conveyed by said signaling channel in such a way that the network ensures priority processing of said packets during their transport.

5. The method as claimed in claim 4, in which the management node apparatus marks the signaling data packets conveyed by said signaling channel with the aid of a DSCP field (DiffServ Code Point).

6. The method as claimed in claim 4, in which, in the case where the network comprises a plurality of management node apparatuses, the management node apparatus which marks the signaling data packets is that which, first, receives these data and is responsible for retransmitting them to the network across an IP link.

7. The method as claimed in claim 1, in which, during the activation of the channel, the management node apparatus processes the signaling channel to be activated in a priority manner with respect to any other channel for media data transport during the execution of an admission control mechanism for the signaling channel to be activated.

8. The method as claimed in claim 7, in which the management node apparatus processes the signaling channel to be activated in a priority manner with respect to any other channel for media data transport during the execution of one at least of the following two quality of service processing mechanisms: the mechanism for allocating differentiated resources, and the mechanism for preempting resources of another channel in favor of said signaling channel in the event of congestion.

9. A non-transitory recording medium storing a data processing software module for a management node apparatus of a packet mode transmission network, comprising software instructions executable by a computer for controlling the execution by the management node apparatus of the steps of the method as claimed in claim 1.

10. A management node apparatus, comprising a processor, for a packet mode transmission network, the management node apparatus further comprising:
   means for detecting a signaling channel, designed to determine in a quality of service profile received from a user terminal and associated with a request from said terminal to activate a signaling data transport channel, said quality of service profile including a set of quality of service parameters requested by the terminal and comprising a signaling indication parameter (SI), whether said signaling indication parameter is activated so as to detect whether a signaling channel is involved;
   means for modifying the quality of service profile of the requested signaling channel, adapted to modify at least one quality of service parameter of the set of quality of service parameters of the received quality of service profile to increase the priority level of the signaling channel to be activated; and
   means for controlling the management node apparatus in such a way that it processes said requested signaling channel in a priority manner with respect to any other channel for media data transport during the execution of at least one quality of service processing mechanism applied to the signaling channel.

11. The management node apparatus as claimed in claim 10, in which the means for modifying the quality of service profile received are designed to modify at least one of the parameters of the group comprising a traffic class, a parameter defining a relative priority of the signaling channel for the allocation of resources and a parameter defining a relative priority of the signaling channel for preemption.

12. The management node apparatus as claimed in claim 10, in which the means for modifying the quality of service profile received are designed to modify, in the quality of service profile received, at least one throughput across the channel so as to optimize the use of the network resources.

13. The management node apparatus as claimed in claim 10, comprising marking means, designed to mark the signaling data packets in such a way that the network ensures priority processing of said packets during their transport.

14. A packet mode transmission network, comprising at least one management node apparatus as claimed in claim 10.

* * * * *